United States Patent [19]

Finlayson

[11] 4,216,135

[45] * Aug. 5, 1980

[54] ORGANOPHILIC CLAYS AND THIXOTROPIC POLYESTER COMPOSITIONS CONTAINING THE SAME

[75] Inventor: Claude M. Finlayson, Houston, Tex.

[73] Assignee: NL Industries, Inc., New York, N.Y.

[*] Notice: The portion of the term of this patent subsequent to Mar. 28, 1993, has been disclaimed.

[21] Appl. No.: 890,213

[22] Filed: Mar. 27, 1978

[51] Int. Cl.$^2$ .............................................. C08K 9/04
[52] U.S. Cl. ................... 260/40 R; 252/316; 428/404
[58] Field of Search ............. 260/40 R; 252/316; 428/404

[56] References Cited

U.S. PATENT DOCUMENTS

| | | | |
|---|---|---|---|
| 2,531,427 | 11/1950 | Hauser | 252/316 X |
| 3,537,994 | 11/1970 | House | 252/13 |
| 3,974,125 | 8/1976 | Oswald et al. | 260/40 R |
| 4,081,496 | 3/1978 | Finlayson | 260/864 |
| 4,105,578 | 8/1978 | Finlayson et al. | 252/316 |

Primary Examiner—Sandra M. Person

Attorney, Agent, or Firm—Gary M. Nath

[57] ABSTRACT

Organophilic clays and thixotropic cross-linkable polyester compositions containing the same are provided comprising an unsaturated polyester and an unsaturated aromatic monomer such as styrene having dispersed therein an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound, said alkyl groups comprising long chain alkyl radicals having from 8 to 20 carbon atoms, wherein at least 5% of said long chains contain 8 to 14 carbon atoms and preferably at least 20% have 12 carbon atoms, the amount of said ammonium compound reacted with said clay being from 100 to 130 milliequivalents per 100 grams of clay based on 100% active clay.

The polyester commpositions are prepared by a pregel method in which the organophilic clay gellant is mixed with the unsaturated aromatic monomer under high shear to form a pregel and the pregel is then combined with an unsaturated polyester to form the thixotropic compositions.

23 Claims, No Drawings

ORGANOPHILIC CLAYS AND THIXOTROPIC POLYESTER COMPOSITIONS CONTAINING THE SAME

This invention is concerned with organophilic clay complexes which are dispersible in organic liquids to form a gel therein and to thixotropic polyester compositions containing as a gelling agent an organophilic clay comprising the reaction product of a smectite-type clay and a methyl benzyl dialkyl ammonium compound or a dibenzyl dialkyl ammonium compound and the preparation of said compositions from a pregel of an unsaturated aromatic monomer containing said organophilic clay.

It is well known that organic compounds which contain a cation will react under favorable conditions by ion-exchange with clays which contain a negative layer-lattice and exchangeable cations to form organophilic organic-clay products. If the organic cation contains at least one alkyl group containing at least 10 carbon atoms, then such organoclays have the property of swelling in certain organic liquids. See for example U.S. Pat. No. 2,531,427 and U.S. Pat. No. 2,966,506, both incorporated herein by reference, and the book "Clay Mineralogy", 2nd Edition, 1968 by Ralph E. Grim (McGraw-Hill Book Co., Inc.), particularly Chapter 10, Clay-Mineral-Organic Reactions; pp. 356–368—Ionic Reactions, Smectite; and pp. 392–401—Organophilic Clay-Mineral Complexes.

Since the commercial introduction of these organoclays in the early 1950's (trademarked BENTONE), it has become well known to gain the maximum gelling (thickening) efficiency from these organoclays by adding a low molecular weight polar organic material to the composition. Such polar organic materials have been variously called dispersants, dispersion aids, solvating agents, dispersion agents and the like.

It is disclosed in U.S. Pat. No. 3,753,906 that water is a dispersant when used in a heated grease preparation process. U.S. Pat. No. 3,654,171, however, discloses that water is not a dispersant in grease preparation processes conducted at a temperature ranging from ambient to about 220° F. (104.44° C.). These polar materials may also affect properties other than the viscosity or gel strength of the organic gels, such as mechanical stability, thixotropy, and storage stability.

The most efficient and accepted polar materials for use as dispersants have been found to be low molecular weight alcohols and ketones, particularly methanol and acetone. These dispersants, however, have very low flash points and require the use of flame-proof apparatus. Higher boiling, high flash point dispersants may be used but these are less efficient and often produce gels having poor secondary properties such as mechanical stability or storage stability.

U.S. Pat. No. 3,537,994 discloses the use of organophilic clays prepared from methyl benzyl dihexadecyl ammonium compounds as gellants for lubricating greases. All of the examples in this patent disclose the use of a polar organic dispersant for the organophilic clay in the preparation of the greases.

Accordingly, there is a need for an organophilic clay gellant which is easy to disperse in organic systems and which requires no dispersant, other than perhaps minor quantities of water, for gelling organic systems.

An organophilic clay gellant having enhanced dispersibility in organic systems has been unexpectedly discovered comprising the reaction product of a methyl benzyl dialkyl ammonium compound or dibenzyl dialkyl ammonium compound, the alkyl groups having 8 to 20 carbon atoms wherein at least 5% have 8 to 14 carbon atoms and a smectite-type clay having a cation exchange capacity of at least 75 milliequivalents per 100 grams of said clay, and wherein the amount of said ammonium compound is from 100 to 130 milliequivalents per 100 grams of said clay, 100% active clay basis.

Unsaturated polyester compositions comprising polyesters based on unsaturated acids or acid anhydrides and diols in admixture with unsaturated aromatic monomers such as styrene have been described heretofore for the production of cross-linked polymers initiated by peroxides. In the preparation of glass fiber-reinforced laminates of these cross-linked polymers, thixotropic gelling agents are employed which decrease the viscosity of the uncross-linked polyester at high shear such as is developed in mixing and spraying but which increase their viscosity at low or no shear to prevent drainage of the composition along the vertical surfaces to which they are applied.

In the past, asbestos and fine particle size silica have acted as efficient gelling agents for such polyester compositions. However, both asbestos and silica, especially fumed silica, present health hazards; also, silica often reduces the clarity and shelflife of compositions in which it is contained.

In an effort to depart from the use of silica and asbestos as gelling agents, certain organophilic clays, which have heretofore been effective gellants for liquid hydrocarbon systems, have been employed as gellants for unsaturated polyester compositions. Such organophilic clays can be described as the reaction product of a natural or synthetic clay and a higher alkyl-containing quaternary ammonium compound. For purposes of brevity, these organophilic clays are often named as compounds rather than reaction products, e.g. dimethyl dioctadecyl ammonium bentonite or benzyl methyl ditallow ammonium hectorite.

In U.S. Pat. No. 3,014,001 to E. J. Murray for example, glossy air-cured and non-inhibited polyester coatings are described which are prepared from a polymerizable unsaturated polyester composition which includes an alkyl resin derived from a mixture of maleic anhydride, phthalic anhydride and a diol and a copolymerizable unsaturated monomer such as styrene. The composition also contains an organic peroxide catalyst, a metallic salt drier, a crystalline wax, and an organic onium bentonite such as dimethyl dioctadecyl ammonium bentonite or other organic onium bentonite sold under the registered trademark "BENTONE" of N L Industries, Inc. The polyester compositions of this patent are prepared by first dispersing the bentonite in the unsaturated aromatic monomer and the dispersion is then added to a polyester composition also containing the wax, drier and peroxide catalyst.

In U.S. Pat. No. 3,974,125 to Oswald and Barnum, thixotropic gelling agents for liquid unsaturated polyester compositions are described comprising higher dialkyl dimethyl ammonium clays which are incorporated into the polyester by a pregel process. The pregel process comprises mixing the quaternary ammonium clay with an unsaturated aromatic monomer such as styrene under high shear to form a pregel and then mixing the pregel with a major amount of an unsaturated polyester which may also contain additional monomers to produce a clear and stable gelled polyester having thixotropic properties. The higher dialkyl groups of the dialkyl dimethyl ammonium clays contain from 14 to 24 carbon atoms, preferably 16 to 18 carbon atoms. Dioctadecyl and ditallow groups are cited as most effective. The clays include the natural and synthetic metal and ammonium alumino silicates with the three-layered montmorillonites being preferred. The unsaturated polyester comprises from 50% to 95% by weight of the total composition with the unsaturated aromatic monomer constituting the remainder. The gelling agent concentration in the final polyester composition ranges from 0.25% to 10% by weight of the total composition. In preparing the pregels, the amount of clay gellant can range from 0.5% to 25% and preferably 2% to 12% by weight of the pregel.

Although the organophilic clay gellants such as the dimethyl higher dialkyl ammonium montmorillonites as described in the above patents provide thixotropic properties to the final polyester compositions in which they are incorporated, these gellants do not form handleable pregels at high concentration of organophilic clay, i.e., the pregels are not flowable and are not homogenous mixtures. The pregels of U.S. Pat. No. 3,974,125 containing about 6% clay gellant for example, are grease-like in consistency and cannot be handled further for addition to the polyester without special equipment and cost to the user. At concentrations of gellant greater than 6%, these pregels are so stiff they are virtually unhandleable for further use. Pregels formed from hectorite derivatives of such compounds form acceptable pregels but do not impart the desired rheology to the final polyester composition. This is not only true for the clay gellants of the above patents, but also of other organophilic clays such as trimethyl higher alkyl and dimethyl benzyl higher alkyl bentonites. This restriction on the amount of clay gellant which can be used to form handleable pregels, in turn limits the amount of clay gellant which can be incorporated into the final polyester composition because the maximum amount of unsaturated aromatic monomer which can be combined with the polyester is also limited. For example, if a polyester formulation comprising 70% unsaturated polyester and 30% styrene by weight is combined with additional styrene and a thickener, the maximum amount of styrene which can be added is limited by a ratio of 58 parts by weight of ester to 42 parts by weight of styrene. Therefore the gellant concentration in the styrene pregel dictates the gellant concentration in the final polyester composition; it cannot be increased by attempts to increase the styrene.

In U.S. Pat. No. 3,974,125, the 6% concentration of gellant in the styrene pregel limited the amount of gellant which could be incorporated in the unsaturated polyester compositions of the examples to about 1.5%. When it was desired to prepare thixotropic unsaturated polyester compositions containing greater than 1.5% gellant, resort was made to the direct addition of gellant to an unsaturated polyester resin as in Example 7.

The present invention on the other hand provides thixotropic polyester compositions prepared by the pregel method containing novel organophilic clay gellants which when mixed with unsaturated aromatic monomer at high concentrations form soft and handleable pregels and at the same time impart excellent rheology to the polyester compositions in which they are incorporated. The polyester compositions and pregels formed with these gellants are characterized by high viscosities at low shear rates and high thixotropic indices. Thixotropic Index as defined herein is the ratio of the Brookfield viscosity in cps at 6 r.p.m. (numerator) and 60 r.p.m. (denominator); each measurement taken after the same time of stirring, at the same temperature and using the same spindle.

The present invention provides a thixotropic cross-linkable polyester composition and process for preparing said composition by the pregel method wherein the polyester composition comprises an unsaturated polyester and an unsaturated aromatic monomer having dispersed therein an organophilic clay gellant comprising the reaction product of a smectite-type clay having a cation exchange capacity of at least 75 milliequivalents per 100 g of clay and a methyl benzyl dialkyl ammonium compound or a dibenzyl dialkyl ammonium compound, said alkyl groups contain 8 to 20 carbon atoms wherein at least 5% have 8 to 14 carbon atoms, and the amount of said ammonium compound reacted with said clay being from 100 to 130 milliequivalents per 100 g of clay based upon 100% active clay.

The polyester composition of this invention is prepared by the pregel method which comprises mixing the organophilic clay gellant with the unsaturated aromatic monomer under high shear to form a thixotropic pregel and combining this pregel with a liquid unsaturated polyester which may also contain additional unsaturated aromatic monomer under low shear to form the thixotropic polyester composition. The final polyester composition can then be cross-linked to produce coatings or glass fiber-reinforced laminates as well known in the art.

In a typical procedure, clay gellant and an unsaturated aromatic monomer such as styrene are mixed in a Cowles dispersator or other high shear apparatus and stirred for ten minutes at 2000 r.p.m. to form a soft and handleable pregel. This pregel is then added to an unsaturated polyester and additional styrene under low shear to form a polyester composition having a high thixotropic index and excellent rheology.

The clays used to prepare the organophilic clay gellants of this invention are smectite-type clays which have a cation exchange capacity of at least 75 milliequivalents per 100 grams of clay. Particularly desirable types of clay are the naturally-occurring Wyoming varieties of swelling bentonites and like clays, and hectorite, a swelling magnesium-lithium silicate clay.

The clays, especially the bentonite type clays, are preferably converted to the sodium form if they are not already in this form. This can conveniently be done by preparing an aqueous clay slurry and passing the slurry through a bed of cation exchange resin in the sodium form. Alternatively, the clay can be mixed with water and a soluble sodium compound such as sodium carbonate, sodium hydroxide and the like and shearing the mixture with a pugmill or extruder.

Smectite-type clays prepared synthetically by either a pneumatolytic or, preferably a hydrothermal synthesis process can also be used to prepare the present organophilic clays. Representative of such clays are Montmorillonite, Bentonite, Beidellite, Hectorite, Saponite and Stevensite. These clays may be synthesized hydrothermally by forming an aqueous reaction mixture in the form of a slurry containing mixed hydrous oxides or hydroxides of the desired metals with or without, as the case may be, sodium (or alternate exchangeable cation of mixture thereof) flouride in the proportions for the particular synthetic smectite desired. The slurry is then placed in an autoclave and heated under autogenous pressure to a temperature within the range of approximately 100° to 325° C., preferably 274° to 300° C., for a sufficient period of time to form the desired product. Representative hydrothermal processes for preparing synthetic smectites are described in the following U.S. patents, incorporated herein by reference; U.S. Pat. Nos. 3,252,757 to Granquist; 3,586,478 to Neumann; 3,666,407 to Orlemann; 3,671,190 to Neumann; 3,844,978 and 3,844,979 to Hickson; and 3,852,405 and 3,855,147 to Granquist.

The cation exchange capacity of the smectite clays can be determined by the well-known ammonium acetate method.

The quaternary ammonium compounds which are reacted with these smectite-type clays are methyl benzyl dialkyl or dibenzyl dialkyl ammonium salts, the alkyl groups comprising alkyl radicals having from 8 to 20 carbon atoms wherein at least 5% is 8 to 14 carbon atoms and preferably at least 20% have 12 carbon atoms. The salt anion is preferably selected from the group consisting of chloride and bromide, and mixtures thereof, and is more preferably chloride, although other anions such as acetate, hydroxide, nitrite, etc., may be present in the quaternary ammonium salt to neutralize the quaternary ammonium cation. These quaternary ammonium salts can be represented by the formula;

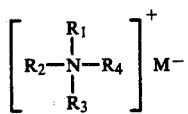

wherein $R_1$ is $CH_3$ or $C_6H_5CH_2$; $R_2$ is $C_6H_5CH_2$; and $R_3$ and $R_4$ are alkyl groups containing long chain alkyl radicals having 8 to 20 carbon atoms; and wherein M is selected from the group consisting of chloride, bromide, nitrite, hydroxyl, acetate, methyl sulfate and mixtures thereof.

The preferred quaternary ammonium salts are methyl benzyl dicoconut fatty acid ammonium chloride and dibenzyl dicoconut fatty acid ammonium chloride. Commercially prepared coconut fatty acid typically analyzes 5–9% $C_8$, 4–10% $C_{10}$, 44–51% $C_{12}$, 13–18% $C_{14}$, 7–10% $C_{16}$, and 1–4% $C_{18}$ alkyl groups.

The organophilic clays of this invention can be prepared by admixing the clay, quaternary ammonium compound and water together, preferably at a temperature within the range of from 100° F. (36° C.) to 180° F. (82° C.), more preferably from 140° F. (60° C.) to 170° F. (77° C.) for a period of time sufficient for the organic quaternary ammonium compound to react with the clay particles, followed by filtering, washing, drying, and grinding. If using the organophilic clays in emulsions, the drying and grinding steps may be eliminated. When admixing the clay, quaternary ammonium compound and water in such concentrations that a slurry is not formed, then the filtration and washing steps can be eliminated.

Preferably the clay is dispersed in water at a concentration from about 1% to 7% by weight, the slurry optionally centrifuged to remove non-clay impurities which constitute about 10% to about 50% by weight of the starting clay composition; the slurry agitated and heated to a temperature in the range of from 140° F. (60° C.) to 170° F. (77° C.); the quaternary amine salt added in the desired milliequivalent ratio, preferably as a liquid in isopropanol or dispersed in water; and the agitation continued to effect the reaction.

The amount of the quaternary ammonium compound added to the clay for purposes of this invention must be sufficient to impart to the clay the enhanced dispersion characteristics desired. The milliequivalent ratio is defined as the number of milliequivalents of the quaternary ammonium compound in the organophilic clay, per 100 grams of clay, 100% active basis. The organophilic clays of this invention have a milliequivalent ratio of from 100 to 130. At lower milliequivalent ratios the organophilic clays are ineffective gellants even though they may be effective gellants when dispersed in a conventional manner with a polar additive. At higher milliequivalent ratios the organophilic clays are poor gellants. However, the preferred milliequivalent ratio within the range of from 100 to 130 will vary depending on the characteristics of the organic system to be gelled by the organophilic clay.

The unsaturated aromatic monomers of this invention are aromatic compounds to which is bonded one or more ethylenically unsaturated radicals such as a vinyl radical, substituted vinyl radical or an allylic radical. Suitable monomers include styrene, α-methyl styrene, divinyl benzene and allyl benzene. Styrene is preferred due to its effectiveness, wide use and availability. Such monomers are used in cross-linking the polyesters and also act as diluents to reduce viscosity.

The unsaturated polyesters useful in preparing the thixotropic compositions of this invention are polyesters of a dicarboxylic acid and a diol having a major amount of olefinic unsaturation, preferably 10 to 75 olefin groups per 100 ester groups. The olefinic unsaturation is preferably derived from the carboxylic acid although the diol may also be unsaturated. Typical diols are ethylene glycol and propylene glycol. Typical unsaturated acids include maleic acid, fumaric acid and phthalic acid. Anhydrides of these acids are also commonly used. Such polyesters are made by conventional techniques of esterification as well known in the art. Generally, polyesters having molecular weights of from about 400 to 10,000 and acid numbers in the range of from 35 to 45 mg KOH per gram of resin are useful for preparing thixotropic compositions of this invention.

The amounts of organophilic clay gellant used in forming the pregels of this invention can range from 0.25% to 40% by weight of the pregel. In the case of styrene, the upper limit is about 20% by weight of the pregel. Preferably, the amount of clay gellant comprises from 6% to 14% by weight of the pregel. Within these ranges, soft pregels are formed which can be easily handled for further addition to the unsaturated polyester. By attaining such high gellant concentrations in the pregels, amounts of clay gellant in the polyester compositions can be up to 4% by weight of the total composition or more while providing excellent rheologies to the system.

The amounts of unsaturated polyester in the final polyester composition can range from at least 40% and preferably from about 50% to 95% by weight with the remainder being unsaturated aromatic monomer.

Pregels based on organophilic bentonite clays, particularly methyl benzyl decoconut fatty acid ammonium bentonite, provide excellent pregels and impart the best rheologies to the polyester compositions. Organophilic clays based on hectorite give soft pregels but rheologies are somewhat poorer than the bentonite-based clay gellants.

In order to more completely describe the present invention, the following examples are given. All percentages given are based upon weight unless otherwise indicated.

EXAMPLE 1

About 1500 grams of a 2.9% slurry of Wyoming bentonite in water which had been previously treated by centrifugation to remove all non-clay impurities and ion-exchanged to provide the clay in the sodium form was heated to about 150° F. and combined with 25.7 grams of 90.0% active methyl benzyl dicoconut fatty acid ammonium chloride. The mixture was stirred for 45 minutes, filtered to remove solids, dried at 150° F. and finally ground to yield an organophilic clay gellant containing 113.3 milliequivalents of quaternary ammonium compound per 100 grams of clay.

A styrene pregel was prepared by mixing 24 parts by weight of the methyl benzyl dicoconut fatty acid ammonium bentonite prepared above (MBDCA Bentonite) with 276 parts by weight of styrene on a Cowles dispersator at 2000 r.p.m. for ten minutes. The resulting pregel was a soft paste containing 8% by weight of the clay gellant. Seventy five grams of this pregel were added to 225 grams of an unsaturated polyester formulation comprising 64% of an unsaturated polyester resin and 36% styrene (Polyester E-440) on a Cowles dispersator and stirred for ten minutes at 2000 r.p.m. The resulting polyester composition contained 48% polyester and 52% styrene having dispersed therein 2% of the clay gellant.

For comparison purposes, 6 grams of fine particle size silica was added to 219 grams of the above 70% polyester-30% styrene formulation and 75 grams of styrene on a Cowles dispersator and stirred at 2000 r.p.m. for ten minutes to form a thickened polyester composition containing 2% silica. The silica could not be added to styrene alone to form a pregel because of its bulk.

Table I

| Organophilic Clay Mellant | Brookfield Viscosities (cps) at Various Stirring Rates | | Thixotropic Index (Ratio of Viscosities at 6 & 60 r.p.m.) |
|---|---|---|---|
| | 6 rpm | 60 rpm | |
| MBDCA Bentonite | 775 | 325 | 2.4 |
| Silica | 820 | 328 | 2.5 |

EXAMPLE 2

About 1500 grams of a 2.9% slurry of Wyoming bentonite in water which had been previously treated by centrifugation to remove all non-clay impurities and ion-exchanged to provide the clay ion the sodium form was heated to about 150° F. and combined with 28.0 grams of 90.0% active methyl benzyl dicoconut fatty acid ammonium chloride. The mixture was stirred for 45 minutes, filtered to remove solids, dried at 150° F. and finally ground to yield an organophilic clay gellant containing 123.0 milliequivalents of quaternary ammonium compound per 100 grams of clay.

A styrene pregel was prepared by mixing 24 parts by weight of the methyl benzyl dicoconut fatty acid ammonium bentonite prepared above (MBDCA Bentonite) with 276 parts by weight of styrene in a Cowles dispersator at 2000 r.p.m. for ten minutes. The resulting pregel was a soft paste containing 8% by weight of the clay gellant. Seventy five grams of this pregel were added to 225 grams of an unsaturated polyester formulation comprising 64% of an unsaturated polyester resin and 36% styrene (Polyester E-440) in a Cowles dispersator and stirred for ten minutes at 2000 r.p.m. The resulting polyester composition contained 48% polyester and 52% styrene having dispersed therein 2% of the clay gellant.

This pregel was compared with a similarly prepared pregel which contained as the organophilic clay gellant dimethyl dihydrogenated fallow ammonium bentonite (DMDTA Bentonite).

Viscosity data for both polyester compositions are given below in Table II. The viscosity determinations were made using a Brookfield RVT viscometer using a No. 5 spindle.

Table II shows that the organophilic clay gellant of this invention (MBDTA Bentonite) imparts higher viscosities to the polyester compositions, a higher Thixotropic Index and a better rheology than the comparison examples. Moreover, the pregels formed using the clay gellant of this invention are softer and more easily handled than any of the other gellants which are either too stiff, too difficult to form by mixing or cavitate during mixing thus rendering them unhandleable for preparing the final polyester compositions.

The invention being thus described, it will be obvious that the same may be varied in many ways. Such variations are not to be regarded as a departure from the spirit and scope of the invention and all such modifications are intended to be included within the scope of the following claims.

Table II

| Organophilic Clay Gellant | Brookfield Viscosities (cps) at Various Stirring Rates | | Thixotropic Index (Ratio of Viscosities at 6 & 60 r.p.m.) | Pregel Characteristics |
|---|---|---|---|---|
| | 6 | 60 | | |
| MBDCA Bentonite | 955 | 357 | 2.7 | Soft, handleable, pumpable |
| DMDTA Bentonite | 745 | 327 | 2.3 | Very stiff; Unhandleable; Cavitates when viscosity measurements attempted. |

What is claimed is:

1. A thixotropic cross-linkable polyester composition comprising an unsaturated polyester and an unsaturated aromatic monomer having dispersed therein an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound, said alkyl groups containing 8 to 20 carbon atoms wherein at least 5% have 8 to 14 carbon atoms and the amount of said ammonium compound reacted with said clay being from 100 to 130 milliequivalents per 100 grams of clay based upon 100% active clay, and wherein said organophilic clay gellant comprises up to 4% by weight of said composition.

2. The polyester composition of claim 1 wherein said unsaturated aromatic monomer is styrene.

3. The polyester composition of claim 1 wherein said clay is hectorite or sodium bentonite.

4. The polyester composition of claim 1 wherein at least 20% of said alkyl groups have 12 carbon atoms.

5. The polyester composition of claim 1 wherein said unsaturated polyester comprises at least 40% of said composition.

6. A thixotropic cross-linkable polyester composition comprising an unsaturated polyester and an unsaturated aromatic monomer having dispersed therein an organophilic clay gellant comprising the reaction product of a smectite-type clay selected from the group consisting of hectorite and sodium bentonite, and a methyl benzyl dialkyl ammonium compound or a dibenzyl dialkyl ammonium compound, said dialkyl groups containing 8 to 20 carbon atoms wherein at least 5% have 8 to 14 carbon atoms, the amount of said ammonium compound reacted with said clay being from 100 to 130 milliequivalents per 100 grams of clay based upon 100% active clay, wherein said unsaturated polyester comprises at least 40% of said composition and wherein said organophilic clay gellant comprises up to 4% by weight of said composition.

7. A thixotropic polyester composition comprising an unsaturated polyester and styrene having dispersed therein an organophilic clay gellant comprising the reaction product of a hectorite or sodium bentonite clay having a cation exchange capacity of at least 75 milliequivalents per 100 grams of clay and a quaternary ammonium compound represented by the formula;

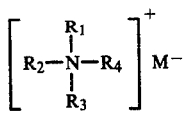

wherein $R_1$ is $CH_3$ or $C_6H_5CH_2$; $R_2$ is $C_6H_5CH_2$; and $R_3$ and $R_4$ are each a coconut fatty acid group; and M is selected from the group consisting of chloride, bromide, nitrate, hydroxyl, acetate, methyl sulfate and mixtures thereof; and wherein the amount of ammonium compound reacted with said clay is from 100 to 130 milliequivalents per 100 grams of clay based on 100% active clay, and wherein said organophilic clay gellant comprises up to 4% by weight of said total composition.

8. The polyester composition of claim 7 wherein said organophilic clay comprises the reaction product of a sodium bentonite and methyl benzyl dicoconut fatty acid ammonium chloride.

9. The polyester of claim 7 wherein said organophilic clay comprises the reaction product of a sodium bentonite and dibenzyl dicoconut fatty acid ammonium chloride.

10. The polyester of claim 7 wherein said organophilic clay comprises the reaction product of hectorite with methyl benzyl dicoconut fatty acid ammonium chloride.

11. The polyester composition of claim 7 wherein said organophilic clay comprises the reaction product of hectorite with dibenzyl dicoconut fatty acid ammonium chloride.

12. A process for preparing thixotropic unsaturated polyester composition comprising;

(a) forming a pregel of an aromatic unsaturated monomer with an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound, wherein the alkyl groups contain 8 to 20 carbon atoms, wherein at least 5% have 8 to 14 carbon atoms the amount of said ammonium compound reacted with said clay being from 100 to 130 milliequivalents per 100 grams of clay based on 100% active clay; and (b) combining said pregel with a liquid unsaturated polyester to form a thixotropic composition.

13. The process of claim 12 wherein the clay gellant comprises from 0.25% to 40% by weight of said pregel.

14. The process of claim 13 wherein said gellant comprises from 6% to 14% of said pregel.

15. The process of claim 12 wherein said pregel is added to said liquid unsaturated polyester.

16. The process of claim 12 wherein at least 20% of said alkyl groups have 12 carbon atoms.

17. A process for preparing thixotropic unsaturated polyester composition comprising;

(a) forming a pregel of an aromatic unsaturated monomer with an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound, said dialkyl groups comprising long chain alkyl radicals having 8 to 20 carbon atoms wherein at least 20% have 12 carbon atoms, the amount of said ammonium compound reacted with said clay being from 100 to 130 milliequivalents per 100 grams of clay based on 100% active clay; and (b) combining said pregel with a liquid unsaturated polyester to form a thixotropic composition.

18. The process of claim 17 wherein the clay gellant comprises from 0.25% to 40% by weight of said pregel.

19. The process of claim 18 wherein the clay gellant comprises from 6% to 14% of said pregel.

20. The process of claim 17 wherein said pregel is added to said liquid unsaturated polyester.

21. An organophilic clay gellant having enhanced dispersibility in organic systems comprising the reaction product of a methyl benzyl dicoconut fatty acid ammonium compound or dibenzyl dicoconut fatty acid ammonium compound and a smectite-type clay having a cation exchange capacity of at least 75 milliequivalents per 100 grams of said clay, and wherein the amount of said ammonium compound is from 100 to 130 milliequivalents per 100 grams of said clay, 100% active clay basis.

22. The composition of claim 21 wherein the smectite-type clay is selected from the group consisting of hectorite and sodium bentonite.

23. The composition of claim 21 wherein the smectite-type clay contains from about 10% to about 50% nonclay impurities.

* * * * *

UNITED STATES PATENT OFFICE
CERTIFICATE OF CORRECTION

Patent No. 4,216,135        Dated August 5, 1980

Inventor(s) Claude Malcolm Finlayson

It is certified that error appears in the above-identified patent and that said Letters Patent are hereby corrected as shown below:

[*] Notice: "The portion of the term of this patent subsequent to Mar. 28, 1993, has been disclaimed." should read --The portion of the term of this patent subsequent to Mar. 28, 1995, has been disclaimed.--

Signed and Sealed this

Fifteenth Day of September 1981

|SEAL|

Attest:

GERALD J. MOSSINGHOFF

Attesting Officer      Commissioner of Patents and Trademarks